(12) United States Patent
Majumder et al.

(10) Patent No.: US 9,064,312 B2
(45) Date of Patent: Jun. 23, 2015

(54) AUGMENTED REALITY USING PROJECTOR-CAMERA ENABLED DEVICES

(71) Applicant: THE REGENTS OF THE UNIVERSITY OF CALIFORNIA, Oakland, CA (US)

(72) Inventors: Aditi Majumder, Irvine, CA (US); Behzad Sajadi, Irvine, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 276 days.

(21) Appl. No.: 13/625,657

(22) Filed: Sep. 24, 2012

(65) Prior Publication Data

US 2013/0076789 A1    Mar. 28, 2013

Related U.S. Application Data

(60) Provisional application No. 61/538,414, filed on Sep. 23, 2011.

(51) Int. Cl.

| | | |
|---|---|---|
| *G09G 5/00* | (2006.01) | |
| *G06T 3/00* | (2006.01) | |
| *H04N 9/31* | (2006.01) | |
| *G06T 7/00* | (2006.01) | |
| *G09F 19/22* | (2006.01) | |

(52) U.S. Cl.
CPC ............ *G06T 3/0068* (2013.01); *H04N 9/3147* (2013.01); *H04N 9/3185* (2013.01); *H04N 9/3194* (2013.01); *G06T 7/0057* (2013.01); *G06T 2207/10028* (2013.01); *G09F 19/226* (2013.01)

(58) Field of Classification Search
None
See application file for complete search history.

(56) References Cited

U.S. PATENT DOCUMENTS

2004/0058729 A1*   3/2004   Shin-Pin .................... 463/25

OTHER PUBLICATIONS

Behzad Sajadi and Aditi Majumder, Scalable multi-view registration for multi-projector displays on vertically extruded surfaces, Jun. 2010, In Proceedings of the 12th Eurographics / IEEE—VGTC conference on Visualization (EuroVis'10), 1063-1072.*

* cited by examiner

*Primary Examiner* — Phi Hoang
*Assistant Examiner* — Mohammad H Akhavannik
(74) *Attorney, Agent, or Firm* — Shimokaji & Associates, P.C.

(57) ABSTRACT

An augmented reality scene may be registered onto an arbitrary surface. A camera may capture an image of the arbitrary surface. The camera may analyze the surface geometry of the arbitrary surface. In some embodiments, a processing computing device may analyze data captured by the camera and an adjacent camera to reconstruct the surface geometry of the arbitrary surface. A scene may be registered to a three dimensional coordinate system corresponding to the arbitrary surface. A projector may project the scene onto the arbitrary surface according to the registration so that the scene may not display as being distorted.

20 Claims, 5 Drawing Sheets

AUGMENTED REALITY USING PROJECTOR-CAMERA ENABLED DEVICES

CROSS-REFERENCE TO RELATED APPLICATION

This application claims benefit under 35 U.S.C. §119(e) of U.S. Provisional Application having No. 61/538,414 filed Sep. 23, 2011, which is hereby incorporated by reference herein in its entirety.

STATEMENT OF GOVERNMENT INTEREST

The invention described herein was made in the performance of official duties by one or more employees of the University of California University system, and the invention herein may be manufactured, practiced, used, and/or licensed by or for the government of the State of California without the payment of any royalties thereon or therefor. The funding source or government grant number associated with inventions described herein is NSF-IIS-0846144.

BACKGROUND

The embodiments of the present invention relate to image projection and more specifically, to an augmented reality using projector-camera enabled devices.

Lighting real three dimensional objects (for example, a rock wall that has texture and is generally uneven) to create a compelling augmented reality experience is becoming popular for several applications like cultural heritage restoration, architectural lighting, geospatial analysis, scientific visualization, and theatrical lighting. A compelling experience may depend on the efficiency of augmenting the real three dimensional surface with high-resolution, vibrant and dynamic imagery. There may be a challenge in re-creating a scene or an image on uneven surfaces. Elements of the scene may suffer from distortion as the image source does not compensate for the variations in the surface.

Accordingly there is a need for a system that may provide an augmented reality while compensating for non-uniform surfaces.

SUMMARY

According to one aspect of the present invention, a system comprises a projector; a camera coupled to the projector, the camera being disposed to capture an image projected onto an arbitrary surface by the projector; and a processing computing device coupled to the camera configured to: recognize the underlying surface geometry of the arbitrary surface by analyzing data in the image captured by the camera and an adjacent camera, register a scene within a three dimensional coordinate system for display on the arbitrary surface, and control the projector to display the registered scene undistorted onto the arbitrary surface.

According to another aspect of the invention, a method comprises capturing a set of images on an arbitrary surface while patterns are being projected on the arbitrary surface; recognizing a surface geometry of the arbitrary surface; and registering a scene corresponding to the surface geometry of the arbitrary surface.

According to a further aspect of the invention, a computer readable storage medium includes a computer readable code, when executed by a processing computing device, configured to: capture an image of an arbitrary surface; analyze a surface geometry from the image of the arbitrary surface for surface height variations; and register a scene corresponding to the surface height variations of the arbitrary surface.

These and other features, aspects and advantages of the present invention will become better understood with reference to the following drawings, description and claims.

DETAILED DESCRIPTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

As will be appreciated by one skilled in the art, aspects of the present invention may be embodied as a computer program product. Accordingly, aspects of the present invention may take the form of an entirely hardware embodiment, an entirely software embodiment (including firmware, resident software, micro-code, etc.) or an embodiment combining software and hardware aspects. Furthermore, aspects of the present invention may take the form of a computer program product embodied in one or more computer readable medium (s) having computer readable program code embodied thereon.

The computer readable medium may be a computer readable storage medium. A computer readable storage medium may be, for example, a non-transitory or a tangible medium. Computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. A computer readable storage medium may be, for example, an electronic, magnetic, optical, electromagnetic, infrared, or semiconductor system or device.

Computer program instructions may also be loaded onto a computer, a processing computing device, a memory, or other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Broadly, embodiments of the subject technology may provide an augmented reality on arbitrary surfaces. Embodiments may automatically register multiple projector-camera enabled devices in a fully distributed manner on non-planar surfaces. The term "registration" will be understood to refer to image registration, for example, by transforming sets of data into a coordinate system.

Figure 1:
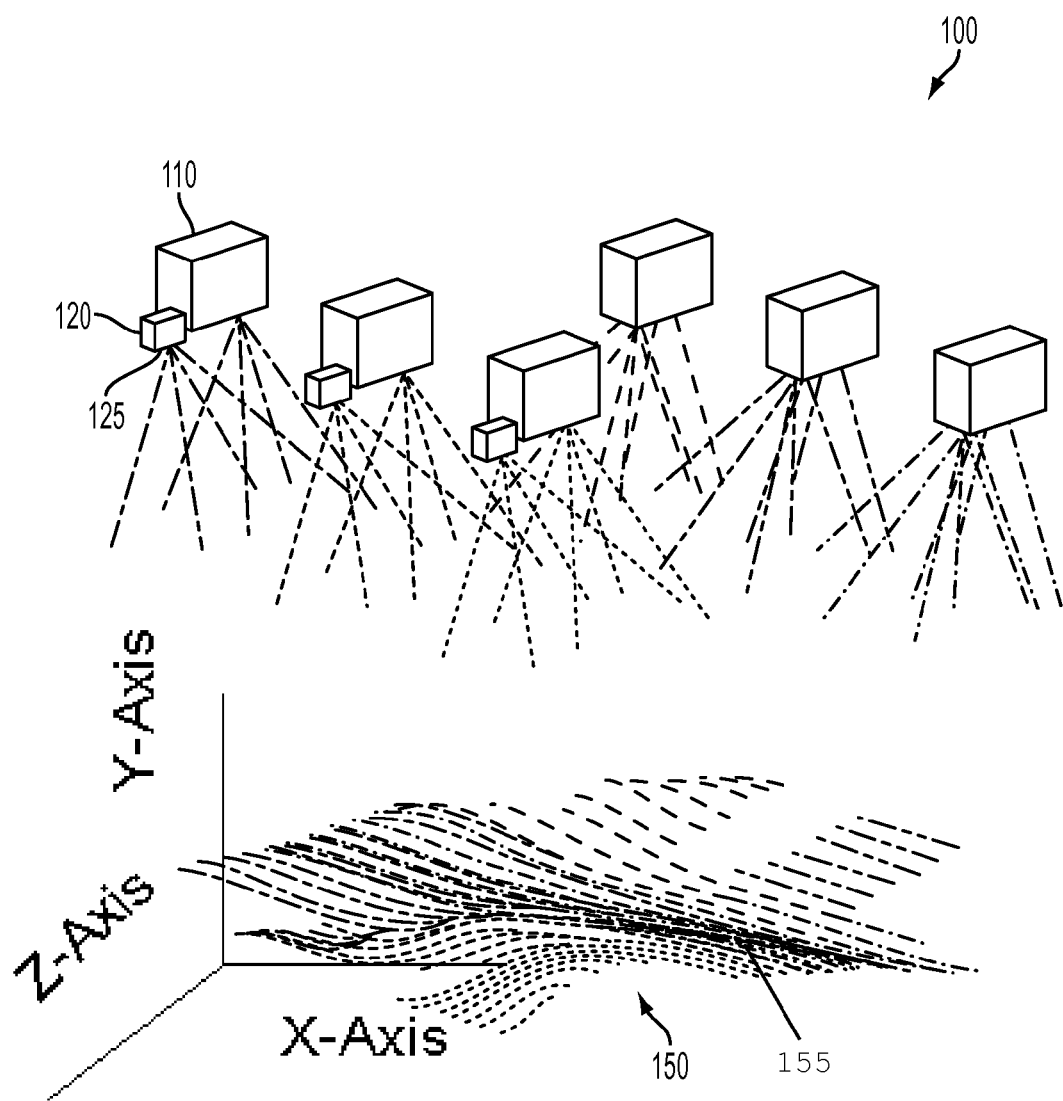
FIG. 1 is a perspective view of an augmented reality registration system in accordance with an exemplary embodiment of the present invention.
Figure 1A:
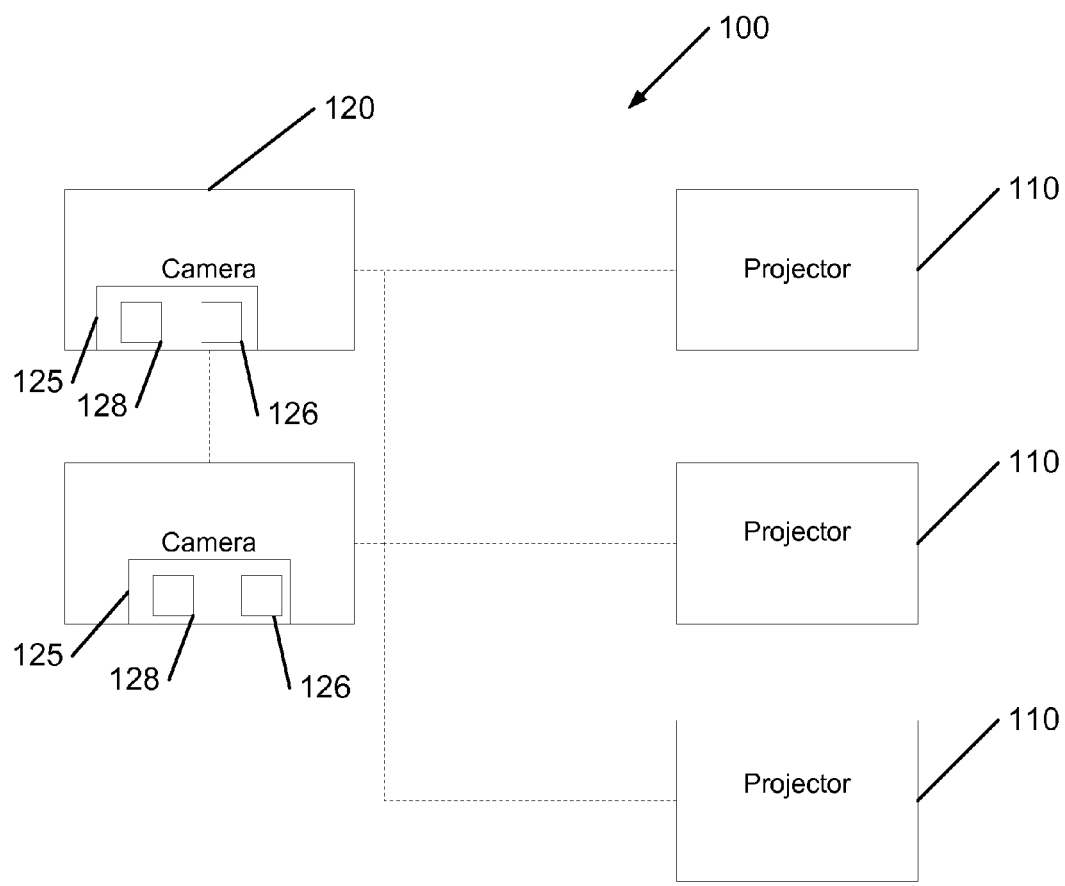
FIG. 1A is a block diagram of the system of FIG. 1.

Referring to FIGS. 1 and 1A, a system 100 is shown according to an exemplary embodiment if the present invention. The system 100 may include at least one projector 110 and at least one camera 120. In some embodiments, the system 100 may include a plurality of cameras 120 coupled to the projector 110. A processing computing device 125 that includes a processor 126 and a memory 128 (also referred to as a non-tangible computer readable media) may be coupled to the camera 120.

In some embodiments, the camera 120 may have a one to one correspondence with the projector 110. In some embodiments, the projector 110 and camera 120 may be coupled together into a physical unit. In some embodiments, the camera 120 may be separate from the projector 110. In some embodiments, the camera 120 may correspond to multiple projectors 110. For example, as shown in FIG. 1A, a camera 120 may be coupled to one or more projectors 110 either by hardwiring or wirelessly. The processing computing device 125 in each camera 120 may thus also control one or more projectors 110 in the system 100. In an exemplary embodiment, a plurality of projectors 110 and cameras 120 may be configured to provide an augmented reality scene 155 on an arbitrary surface 150. The arbitrary surface 150 may be represented as three dimensional coordinates in images captured by the camera(s) 120. The three dimensional coordinates of the arbitrary surface 150 may be stored as a file in the memory 128. The arbitrary surface 150 may be, for example, non-planar, uneven, irregular, or rough. The projectors 110 may be disposed in a non-uniform distribution, for example, in a non-grid formation when pointed at the arbitrary surface 150. The projectors 110 may be disposed to point at and project images onto the arbitrary surface 150. The cameras 120 may be disposed to capture an image(s) of the arbitrary surface 150 and images projected onto the arbitrary surface 150. In some embodiments, the projector 110 may be uncalibrated prior to projecting an image. Thus, no prior knowledge of the arbitrary surface 150 may be necessary when using the system 100. In some embodiments, the camera 120 may be uncalibrated when first acquiring an image of the arbitrary surface 150. Thus it may be appreciated that projectors 110 and cameras 120 may be pointed at any arbitrary surface 150 without any pre-stored data on the arbitrary surface 150 and a stored scene 155 may be registered to the underlying geometry when projected onto the arbitrary surface 150 without distortion in a facilitated point and shoot manner.

The processing computing device 125 may be configured to manage the camera's functionality. The camera 120 may be configured to communicate wirelessly. For example, the camera 120 may include an IP address that can be referenced within a network. The processing computing device 125 may also be configured to relay data among cameras 120 in the system 100 so that adjacent cameras 120 may communicate (either wirelessly or by hardwired fashion) with one another.

In some embodiments, the processing computing device 125 may be configured to analyze data from the camera 110 and control the projector 120 according to the analyzed data. The processing computing device 125 may be configured to analyze information from an image captured by the camera 120 to recognize the underlying surface geometry of the arbitrary surface 150. The processing computing device 125 may be configured to analyze the information related to the underlying surface geometry of the arbitrary surface 150, for example, for surface height variations. The processing computing device 125 may register the scene 155 from projectors 110 onto the arbitrary surface 150 in a three dimensional coordinate system so that projection of the image accounts for surface variations according to the three dimensional coordinate system and may be projected undistorted. Registering may include, for example, associating points in the scene 155 to corresponding three dimensional coordinates along the surface geometry of the arbitrary surface 150 so that the image appears as an undistorted three dimensional scene 155. For example, when the underlying surface geometry of the arbitrary surface 150 (for example, a rocky wall) is analyzed, the projectors 110 may project onto the rocky wall, a scene of a waterfall cascading down over the arbitrary surface 150 so that the underlying surface is indiscernible from the water flow.

In an exemplary embodiment, the camera 120 may be disposed to capture an image of the arbitrary surface 150. In some embodiments, the camera 120 may be disposed so that its field of view captures only a portion of the arbitrary surface 150. In some embodiments, two or more cameras 120 may be disposed to capture overlapping portions of the arbitrary surface 150. The projector 110 may be configured to project an image registered to the arbitrary surface 150 that may be a portion of the overall scene 155. The camera 120 may be configured to operate at a field of view that may be larger than the image projected by the projector 120. In embodiments using a plurality of projectors 110 and cameras 120, each camera 120 may be disposed to capture the image of the projector 110 corresponding to said camera 120, as well as some portion of an image projected by a projector 110 adjacent to the corresponding projector 110. Each camera 120 may be configured to analyze a portion of the arbitrary surface 150 where there may be some overlap between adjacent portions captured within the field of view of each camera 120.

Figure 2:
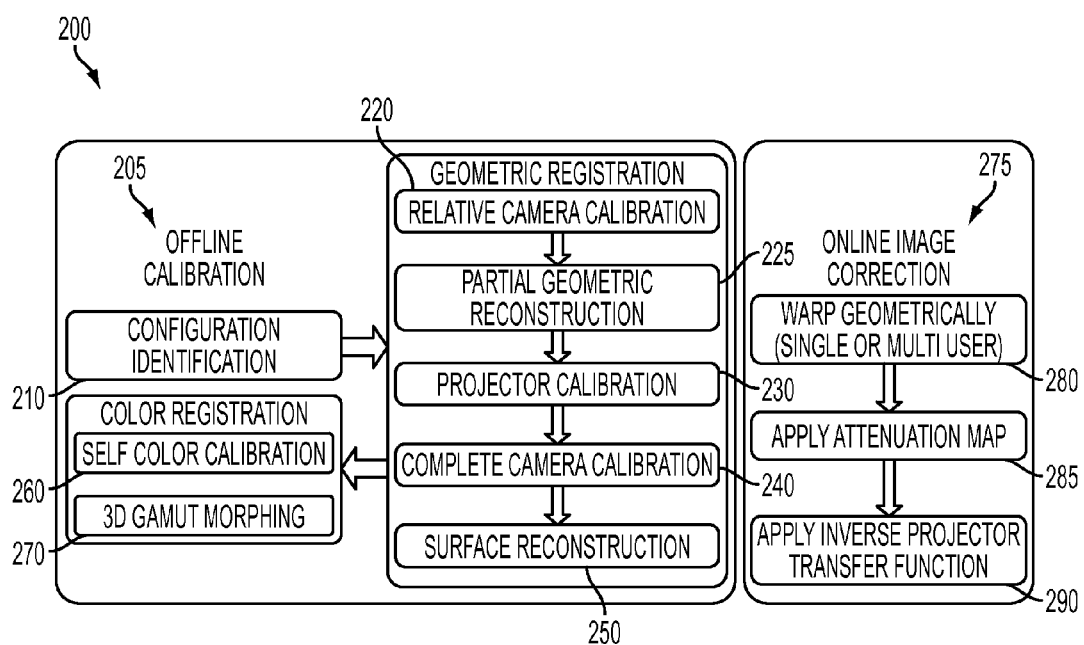
FIG. 2 is a flowchart of a method of registering an image on an arbitrary surface in accordance with still yet another exemplary embodiment of the present invention.
Figure 3:
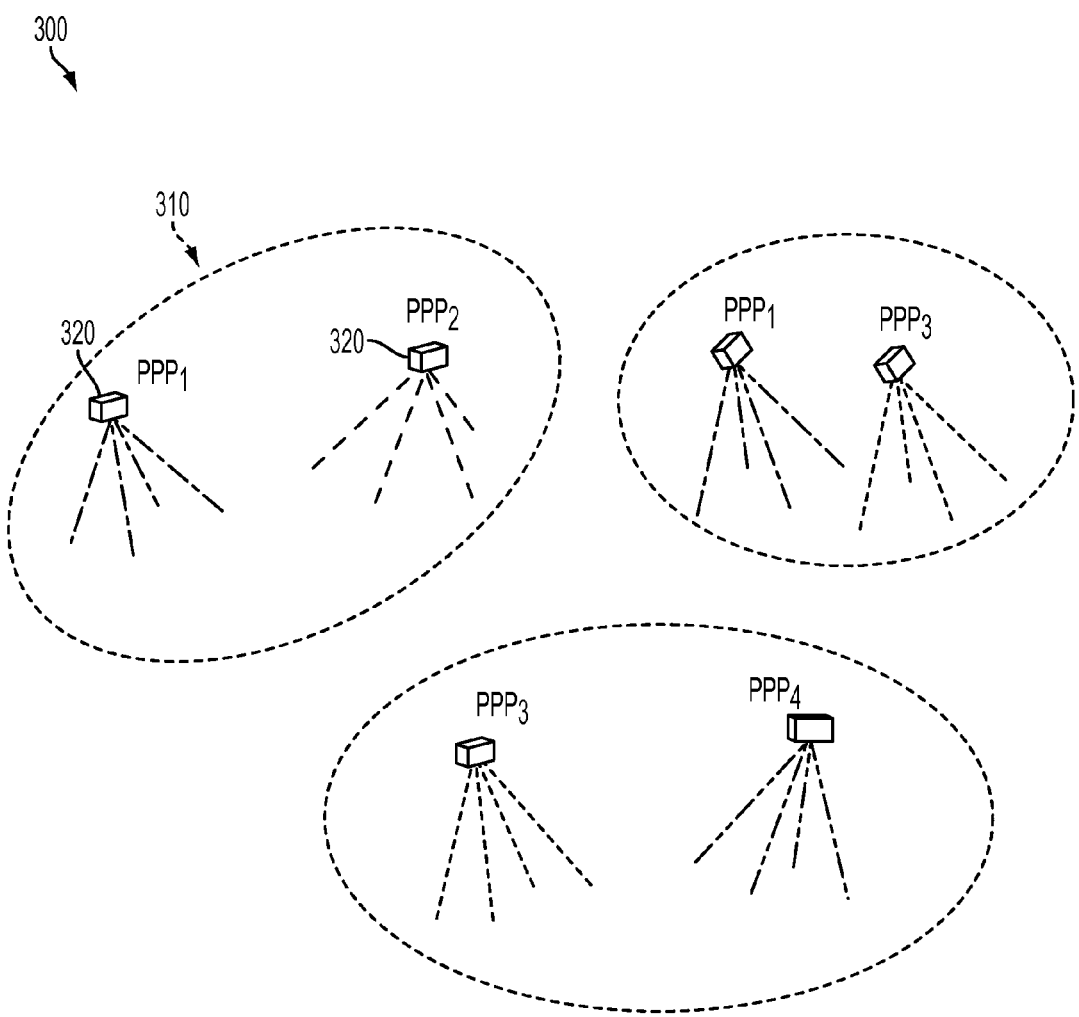
FIG. 3 is a diagrammatic view of projector-camera units used in the system of FIG. 1.
Figure 4:
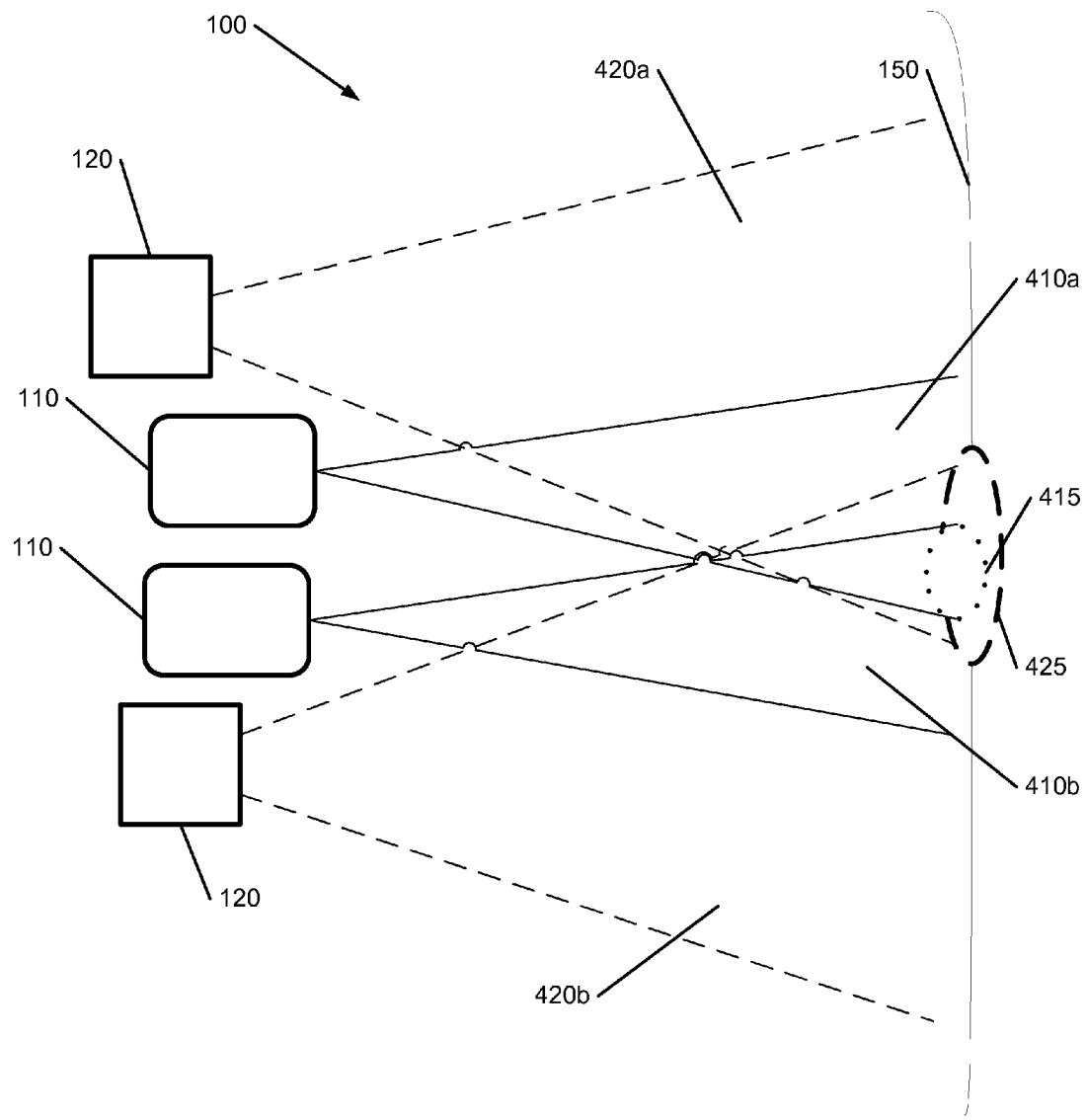
FIG. 4 is a side view of the system of FIG. 1 showing overlapping fields of view for projectors and cameras in the system.

Referring now to FIGS. 2-4, a method 200 (FIG. 2) of providing relief lighting on an arbitrary surface in a system 300 by groups 310 of camera-projector units 320 (FIG. 3) (labeled as "PPP") is shown according to an exemplary embodiment of the present invention. FIG. 4 shows exemplary image projection and capture by projectors 110 and cameras 120 in the system 100. Each projector 110 may project onto the arbitrary surface 150 within a projector field of view 410 (shown as fields of view 410a and 410b for adjacent projectors 110). Each camera 120 may capture an image of the arbitrary surface 150 within camera field of view 420 (shown as fields of view 420a and 420b for adjacent cameras 110). The camera-projector units 320 may comprise the camera 110 associated with the projector 120. The camera-projector units 320 may use plug and play type technology so that the projector 110 may be interchangeably coupled with any other camera 120. The method 200 may comprise a section 205 of offline calibration and a section 275 of online image correction.

In an exemplary embodiment, N projectors to N cameras used in the camera-projector units 320. Every part of the arbitrary surface may be covered by at least one projector and one camera while the number of total projectors and total cameras may be different. The coverage area of each camera may overlap with the coverage area of at least one other camera. The area covered by the projectors and the cameras may form a contiguous region. In an exemplary embodiment, the cameras should be selected to have minimal non-linear lens distortion or the lens distortion may be computed before determining camera calibration. For example, a fisheye lens may be used. Additionally, the projectors used should have minimal non-linear lens distortion or their lenses' distortion may be computed before camera calibration.

The processing computing device 125 may perform configuration identification of projectors 110 in the system 100 in step 210. Configuration identification may include recovering connectivity data among the camera-projector units 320 in the context of overlap in their display space or sensing space. For example, adjacent projectors 110 may each project an image that partially overlaps within a projector overlap region 415 (shown as the dashed line ellipse) on the arbitrary surface 150. Adjacent cameras 120 may capture respective images that partially overlap within a camera overlap region 425 (shown as the dotted line ellipse) on the arbitrary surface 150. The processing computing device 125 may detect the IP address associated with adjacent cameras 120 and may determine the location of the adjacent cameras 120. The processing computing device 125 may determine the projector 110 corresponding to adjacent cameras 120.

In an exemplary embodiment, defining the configuration of the projectors 110 and cameras 120 may involve using two undirected graphs: a camera adjacency graph, $A_c$, and a projector adjacency graph, $A_p$. An edge in $A_c$, i.e. $A_c(i; j)=1$, may denote sufficient overlap in the field of view (FOV) of cameras 120 represented as cameras Ci and Cj (for example, those cameras belonging to the pairs of camera-projector units 320 within the group 310) to allow the use of structure from motion (SfM) techniques to recover their relative positions. Formally, $A_c(i; j)=1$ if the FOV of camera Ci covers more that α; 0<α<1 fraction of the FOV of Cj and vice versa, a may be set to α=0.2. An edge in $A_p$, i.e. $A_p(i; j)=1$, may denote an overlap in the FOV of Pi and Pj (where Pi and Pj represent two adjacent projectors 110). Ap(i; j) may be set to =1 when Ci or Cj observes an overlap in the FOV of Pi and Pj. To recover $A_1$ and $A_p$, the processing computing device 125 may calibrate according to the order of the IP addresses of the camera-projector units 320. A token may be passed around to all the camera-projector units based on a sorted list of IP addresses. When a camera-projector unit i has the token, Pi may display white while any other camera-projector units j, i≠j, may display black. Further, all cameras Cj, i≠j, may capture a picture. This may allow a camera-projector unit j to find its local adjacency in $A_c$ and $A_p$. Once the token is passed among the camera-projector units, each camera 120 may broadcast its local adjacency information to all other camera-projector units. The results may be stored and aggregated on each camera-projector unit 320 to create complete graphs in each of them. However, this graph may be directed. To achieve a consistent undirected graph across all camera-projector units 320, each camera-projector unit 320 may set $A_c(i; j)=A_c(i; j) \vee A_c(j; i)$ and $A_p(i; j)=A_p(i; j) \vee A_p(j; i)$, $\forall (i; j)$. Further, $A_c(i; i)=0$ and $A_p(i; i)=1$.

The processing computing device 125 may provide geometric registration of the underlying geometry of the arbitrary surface 150. Geometric registration may include a step 220 of relative camera calibration. Geometric registration may recover the parameters (intrinsic and extrinsic) of each camera Ci with respect to all its adjacent cameras. For each pair of camera-projector units i and j such that $A_c(i; j)=1$, the set of correspondences between cameras 120 may be recovered and then used to recover the relative camera calibration parameters.

To recover the correspondences between cameras Ci and Cj, binary structured light patterns (SLP) from Pi and Pj may be used. Each of these patterns may be seen by both cameras Ci and Cj allowing the recovery of the correspondences between Ci and Cj as follows. First camera-projector unit j may process the images captured by camera Cj of SLP projected by projector Pi to find the correspondences Pi→Cj. This may then be inverted via interpolation to find the correspondences Cj→Pi. Similarly, camera-projection unit i may process the images captured by Ci of the same SLP projected by Pi to find correspondences Pi→Ci. The correspondences between the two cameras, Cj→Ci may be recovered by first using Cj→Pi followed by using Pi→Ci. Similarly, the SLP projected by Pj may be used to find more correspondences. Thus, cameras Ci and Cj may communicate correspondences with each other creating a larger set of correspondences.

The priority assigned by the sorted IP addresses may be used in communicating information among the camera-projection units 320. The camera-projection unit 320 with the highest priority may put up its SLP broadcasting it to all other camera-projector units 320 initiating a capture in all the adjacent camera-projector units 320. The removal of SLP may also be communicated to all camera-projector units 320 via a broadcast message. Every camera-projector unit 320 may wait for all higher priority adjacent camera-projector units 320 to complete before it starts its SLP. This scheme may allow non-overlapping camera-projector units 320 to put up their SLP for capture simultaneously making the process time-efficient, especially when considering a large number of camera-projector units 320.

Once a camera-projector unit i has recovered its correspondences with its neighbor camera-projector unit j, it may use an iteratively weighted least square method to find the fundamental matrix between Ci and Cj, denoted by Fij. Assuming the same focal length, camera-projector unit i may then perform a self-calibration routine to recover its camera focal length. Using this information, each camera-projector unit i may estimate a robustness factor rij for the estimated focal length with its neighbor camera-projector unit j. The estimated focal length and rij may be broadcast to all camera-projector units 320. On receiving this information from other camera-projector units 320, camera-projector unit i may compute a weighted average of all the focal lengths weighted by a robustness factor, rij. This may allow convergence to a consistent and robust estimate of f across all camera-projector units 320. With a known Fijs and K (where F may represent a fundamental matrix between camera views i and j and K may represent an intrinsic camera matrix), each camera-projector unit i may compute its essential matrix with respect to an adjacent camera-projector unit j, using the quantity $K^T F_{ij} K$. The corresponding points between cameras Ci and Cj and the essential matrix may be used to recover the relative rotation Rij and translation Tij of the camera pairs, up to a scale factor. The recovered relative pose of camera Ci with respect to camera Cj may be denoted by |Rij|Tij|, where Rij is a 3×3 rotation matrix and Tij is a 3×1 translation vector.

In step 225, the processing computing device 125 may perform a partial geometric reconstruction of the underlying geometry of the arbitrary surface for all the points that are observed by a pair of cameras that are calibrated in the step relative camera calibration. For each calibrated pair of cameras, the processing computing device 125 may run stereo reconstruction to determine the three dimensional location of the data points that are observed by both of the cameras. The set of points determined from the different camera pairs may have different scale factors.

In step 230, the processing computing device 125 may perform a relative projector calibration. A calibration matrix may be computed for each projector 110 with respect to one of the cameras 120. For each projector, all the projector pixels that are covered by at least one camera pair may be reconstructed from the set of data points determined in the step of partial geometric reconstruction. These reconstructed data points may have different scale factors if observed by different camera pairs. The processing computing device 125 may apply a non-linear optimization to the reconstructed data points to recover the calibration matrix of the projector with respect to an arbitrary camera from one of these camera pairs. During this process the processing computing device 125 may also recover a ratio of the scale factors for different camera pairs that observe the same projector.

In step 240, the processing computing device 125 may perform a complete camera calibration. In this step, the processing computing device 125 may compute the parameters of all the projectors 110 and cameras 120 relative to one of the cameras. For example, one of the cameras may be designated as a reference camera. The processing computing device 125 may use the computed relative camera calibration for camera-projector units 320 calculated in step 220 to compute the parameters. The processing computing device 125 may use the relative projector calibration and scale factors computed in step 230.

A linear optimization may be applied to values representing the relative camera calibration, the relative projector calibration, and the scale factors to determine a calibration matrix for the camera-projector units 320 with respect to the reference camera while satisfying all the relative calibration parameters. Each camera-projector unit 320 may find the position and orientation of its camera Ci with respect to a global coordinate system. This may be denoted with a 3×4 matrix, Ei=|Ri|Ti|. To recover Ei for all an N number of camera-projector units 320, leading to 12N unknowns. This can be expressed as Ei in terms of the already computed relative calibration parameter with neighbor Cj as $$Ei = (R_{ji}|s_{ji}T_{ji})(Rj|Tj) \quad (1)$$
$$(000|1) = |R_{ji}R_{jj}s_{ji}T_{ji} + R_{ji}T_j|$$

where $s_{ji}$ is an unknown scale factor. Using this, for every adjacent pair of camera-projector units 320, 12 linear equations may be obtained at the expense of adding 1 unknown, the scale factor. All camera-projector units 320 may consider a selected camera-projector unit 320 as a reference point by assuming $E_1$=I. Further to reach a common scale factor, all the camera-projector units 320 may consider the scale factor of the pair of adjacent projectors with highest priority, p and q, as the reference scale. Hence, $s_{pq}$=1. These references may reduce the total number of unknowns to 12(N−1)+M−1. Assuming M pairs, the total number of equations may be 12M equations. Since M may be usually larger than N, an over-constrained linear system may be achieved which can be solved by standard linear least squares techniques. To achieve this in system 100, all camera-projector units 320 may broadcast their recovered rotation matrix $R_{ij}$ and translation vector $T_{ij}$. Using the rotation matrix $R_{ij}$ and translation vector $T_{ij}$ recovered, each camera-projector unit 320 may run a linear least squares to find its Ei.

In step 250, the processing computing device 125 may perform a complete geometric surface reconstruction of the underlying geometry of the arbitrary surface. For each camera-projector unit i, its projector and camera may already be calibrated with respect to the global coordinate system, as determined per the previous steps in the method 200. The projector and camera within each camera-projector unit 320 may form a stereo pair looking at the surface geometry Si that falls in the FOV of projector Pi. The set of correspondences between the projector-camera pair, Ci→Pi, may be used along with the complete camera calibration and the projector calibration to perform a three dimensional stereo reconstruction of points to recover the surface geometry Si with respect to the global coordinate system. All the cameras Cj and projectors Pj whose field of view or image projection overlap with projector Pi may be considered. This may assure that the surface in the overlap region of multiple camera-projector units 320 may be reconstructed identically. The surface geometry of arbitrary surface 150 may thus be reconstructed.

The geometric registration portion of method 200 may be adjusted for N projectors and M cameras. For example, every part of the arbitrary surface may be covered by at least one projector and two cameras while the number of projectors and cameras in the system may be different. The area covered by the projectors and the cameras may form a contiguous region. The cameras used may be pre-calibrated for lens distortion being used in camera calibration. In an exemplary embodiment, the camera lens may be selected with the least amount of non-linear distortion available. For example, a lens with non-linear distortion that may be used may include a fisheye lens. Since each part of the arbitrary surface is covered by more than one camera, steps 220, 225, and 250 may be employed and steps 230 and 240 may not necessarily be performed to recover the complete geometry of the surface which can be then used to seamlessly register the projectors.

In step 260, self color calibration may be performed. Self color calibration may recover a common camera transfer function, t and the projector color parameters $t^p$, W, and B for each camera-projector unit i. The projector-camera self-calibration may be performed as follows. All camera-projector units 320 may project white images, synchronized via broadcast communications. Each camera Ci may capture this white image at multiple exposures to estimate the camera transfer function. The transfer function recovered by each camera Ci may then be broadcast to all the camera-projector units 320 which may then be averaged by each camera-projector unit 320 to find the common transfer function, t. For each camera-projector unit i of non-overlapping areas, projector Pi may project different intensities of white and the corresponding camera Ci may capture an image with the highest exposure that does not result in saturated areas. The captured images may be linearized using the function t. This image may be converted to XYZ space using an sRGB to XYZ conversion to extract the total tri-stimulus value (which provides an estimate of the total brightness) at each camera pixel given by the addition of the XYZ channels. This value may be averaged across all the camera pixels that fall in the non-overlapping region. This may provide a set of correspondences between the intensity projected by a projector and that captured by a linear camera. These values may be normalized which may provide an estimate of the projector transfer function $t^p_i$.

For each camera-projector unit i, the maximum brightness in red, green and blue from Pi may be projected which may be captured by camera Ci. These images may be linearized using the previously recovered function t and then converted to the XYZ space using a 3×3 matrix for an sRGB to XYZ conversion. Thus XYZ values corresponding to the red, green and blue channels at each pixel of the captured image may form the three rows of a matrix that provides the two dimensional gamut Wi at that pixel. These values may be averaged across all the pixels to find the two dimensional gamut Wi of projector Pi.

Each camera-projector unit i may use camera Ci to recover the maximum brightness profile of its own projector Pi, denoted by Bi. For this, the same red, green and blue images projected by projector Pi may be used and captured by camera Ci while recovering the two dimensional gamut Wi. The color of the captured images may be linearized and converted to XYZ space as described previously. At every pixel, the total tri-stimulus value (X+Y+Z) may be found, which may provide an estimate of the maximum brightness at that pixel. Finding this across all the pixels in the captured image may provide Bi in the coordinate system of camera Ci. The set of correspondences Ci→Pi may be used to warp Bi to the coordinate space of projector Pi.

Gamut smoothing may be achieved in an iterative distributed algorithm in two steps: two dimensional gamut smoothing followed by brightness smoothing. In each iteration in each of these steps, there may be a set of camera-projector units 320, R, that have completed the smoothing operation and hence form a registered subregion of the display. In the first iteration, R may be a singleton set consisting of the camera-projector unit 320 with the highest priority. The highest priority projector may be designated as $P_1$, in the first iteration R={P1} In each of the subsequent iterations, a $P_i \in R^c$ with highest priority that is adjacent to at least one element of R completes the smoothing algorithm. Thus, one camera-projector unit 320 gets added to R in each iteration increasing the registered subregion of the display. The process may stop when all the N number of camera-projector unit 320 are included in R and hence the whole display is registered.

In step 280, the online image correction on the surface may be performed such that overlapping pixels from different projectors may display the same content in a seamless manner. To generate the image Ii to be projected by projector Pi, the geometric registration may be performed in two different ways: view-dependent geometric registration for single-user applications; and view-independent geometric registration for multiuser applications.

In multiuser applications the image Ii may be wallpapered on the arbitrary surface 150. For every location (X;Y;Z) on the arbitrary surface 150, color may be determined based on the specific characteristics of that location. A simple example may include indicating the height of the points in a relief map using different colors. In this case the color may be decided solely based on the Y coordinate of the pixels. Another example may include pasting different map layers over the arbitrary surface 150, e.g. satellite imagery, a road map, or a traffic map.

To achieve a view dependent registration for single user applications, the virtual camera (or viewpoint) with projection matrix V may be defined. This can be different from the viewpoint of any of the calibrating cameras. A two-pass rendering approach maybe employed. The three dimensional scene may be rendered from this virtual camera using projection matrix V. To generate the image Ii for each projector, at any pixel (x;y) the corresponding three dimensional coordinates of the surface geometry $S_i(x;y)$ may be found. The three dimensional coordinate may be found using the projection matrix V to find the corresponding pixel from the image rendered in the first pass. The color at this pixel maybe used to generate the image Ii.

In step 285, the image Ii may be attenuated using $\alpha^r_i$, $\alpha^g_i$, and $\alpha^b_i$, which may represent attenuation maps for R (red), G (green), and B (blue) channels. In step 290, the image Ii may be linearized using the projector transfer function $t^p_i$ to achieve the color registration.

It should be understood, of course, that the foregoing relates to exemplary embodiments of the invention and that modifications may be made without departing from the spirit and scope of the invention as set forth in the following claims.

What is claimed is:

1. A system for projecting an image of a scene onto an arbitrary surface that is non-planar in both horizontal and vertical directions, the system comprising:

a first un-calibrated camera coupled to a first projector, the first un-calibrated camera being disposed to capture at least a first portion of the image projected onto the arbitrary surface by the first projector, wherein the first portion of the image includes a first point;

an adjacent un-calibrated camera coupled to a second projector, wherein the adjacent un-calibrated camera is disposed to capture at least a second portion of the image projected onto the arbitrary surface by the second projector, wherein the second portion of the image includes the first point; and a processing computing device coupled to the first camera configured to:

recognize an underlying surface geometry of the arbitrary surface by analyzing data in the at least first portion of the image captured by the first camera and the at least second portion of the image captured by the adjacent camera, register an overlapping portion of the image of the scene, that is projected by the first projector and projected by the second projector, within a three dimensional coordinate system for display on the arbitrary surface, and control the at least one of the first projector and the second projector to display the overlapping portion of the image of the registered scene onto the arbitrary surface based on an analysis of the data in the at least first portion of the image captured by the first camera and the at least second portion of the image captured by the adjacent camera.

2. The system of claim 1, wherein the arbitrary surface is non-planar.

3. The system of claim 1, wherein the camera is uncalibrated prior to capturing the image.

4. The system of claim 3, wherein the projector is uncalibrated prior to projecting the image.

5. The system of claim 1, wherein the camera captures a field of view larger than a field of view of the projector.

6. The system of claim 1, wherein the camera is disposed to capture a portion of an image associated with an adjacent projector.

7. The system of claim 1, wherein the camera is configured to wirelessly communicate with adjacent cameras or projectors.

8. The system of claim 1, wherein the system comprises a plurality of projectors coupled to the camera.

9. The system of claim 8, wherein the system comprises a plurality of cameras coupled to the plurality of projectors.

10. A method for projecting an image of a scene onto an arbitrary surface that is non-planar in both horizontal and vertical directions, the method comprising:

capturing, from at least one un-calibrated camera, a set of images of the arbitrary surface while patterns are projected on the arbitrary surface by at least two projectors, wherein the arbitrary surface is horizontally and vertically irregular, and wherein at least a first portion of a first image projected by a first projector of the at least two projectors overlaps with at least a second portion of a second image projected by a second projector of the at least two projectors;

recognizing a surface geometry of the arbitrary surface, based on the patterns projected on the arbitrary surface, using stereo reconstruction to determine three dimensional locations of data points within the set of images; and registering the first portion of the first image and the second portion of the second image to project the image of the scene corresponding to the surface geometry of the arbitrary surface.

11. The method of claim 10, wherein the step of capturing includes using two adjacent cameras to capture the set of images.

12. The method of claim 11, comprising recovering correspondences between the two adjacent cameras using binary structured light patterns (SLP) from a plurality of projectors.

13. The method of claim 11, comprising: analyzing the set of images captured by the two adjacent cameras; and reconstructing the recognized surface geometry into a three dimensional image.

14. The method of claim 10, wherein the step of registration includes associating points in the scene to corresponding three dimensional coordinates along the surface geometry of the arbitrary surface.

15. The method of claim 10, comprising projecting a first image in the set of images to overlap an adjacent projected image in the set of images.

16. A non-transitory computer readable storage medium comprising:
a computer readable code, which when executed by a processing computing device, causes the processing computing device to:
capture an image of an arbitrary surface that is non-planar in both horizontal and vertical directions, wherein at least one point within the captured image is: within a field of view of an un-calibrated camera, within a first image projected by a first projector and within a second image projected by a second projector, or within an image projected by a projector and within a first field of view of a first un-calibrated camera and within a second field of view of a second un-calibrated camera;
analyze a surface geometry of the arbitrary surface, from the image of the arbitrary surface, for surface height variations; and
register a first portion of the first image, that is projected by the first projector, with a second portion of the second image, that is projected by the second projector, corresponding to the surface height variations of the arbitrary surface such that first height variations in the first portion of the first image and second height variations in the second portion of the second image are indiscernible from the surface height variations on which the first portion and the second portion are protected.

17. The non-transitory computer readable storage medium of claim 16, wherein the computer readable code when executed by a processing computing device, relays data among adjacent cameras capturing images of the arbitrary surface.

18. The non-transitory computer readable storage medium of claim 16, wherein the scene is registered to correspond to a three dimensional coordinate system associated with the arbitrary surface.

19. The non-transitory computer readable storage medium of claim 16, wherein the computer readable code is configured, when executed by a processing computing device, to reconstruct the captured image using a non-linear optimization on data points representing the captured image.

20. The non-transitory computer readable storage medium of claim 16, wherein the computer readable code is configured, when executed by a processing computing device, to control a projector to display the scene as corresponding to three dimensional coordinates along the surface geometry of the arbitrary surface.

* * * * *